(12) United States Patent
Voss et al.

(10) Patent No.: US 11,444,763 B2
(45) Date of Patent: Sep. 13, 2022

(54) SECURE STORAGE OF ANCHOR PASSPHRASE FOR DBMS

(71) Applicant: SAP SE, Walldorf (DE)

(72) Inventors: Stefan Voss, Postsdam (DE); Martin Brunzema, Berlin (DE); Henrik Hempelmann, Havelberg (DE); Benedikt Klus, Hamberg (DE); Anne Roessiger, Berliin (DE)

(73) Assignee: SAP SE, Walldorf (DE)

( * ) Notice: Subject to any disclaimer, the term of this patent is extended or adjusted under 35 U.S.C. 154(b) by 377 days.

(21) Appl. No.: 16/875,161

(22) Filed: May 15, 2020

(65) Prior Publication Data
US 2021/0359855 A1 Nov. 18, 2021

(51) Int. Cl.
H04L 9/08 (2006.01)
G06F 16/27 (2019.01)
G06F 11/14 (2006.01)
G06F 21/62 (2013.01)

(52) U.S. Cl.
CPC ........ *H04L 9/0894* (2013.01); *G06F 11/1469* (2013.01); *G06F 16/27* (2019.01); *G06F 21/6218* (2013.01); *G06F 2201/80* (2013.01); *G06F 2201/82* (2013.01)

(58) Field of Classification Search
CPC ............... H04L 9/0894; G06F 11/1469; G06F 11/1458; G06F 16/27; G06F 21/6218; G06F 2201/80; G06F 2201/82
See application file for complete search history.

(56) References Cited

U.S. PATENT DOCUMENTS

| 9,740,576 | B2* | 8/2017 | Schefe | G06F 11/1469 |
| 11,379,593 | B2* | 7/2022 | Ferreira | G06F 9/4406 |
| 2016/0352518 | A1* | 12/2016 | Ford | H04L 9/088 |
| 2017/0093820 | A1* | 3/2017 | Ferguson | H04L 9/0891 |

* cited by examiner

Primary Examiner — Brian F Shaw
(74) Attorney, Agent, or Firm — Buckley, Maschoff & Talwalkar LLC

(57) ABSTRACT

A system and method to receive, by a database service from an encryption service of a database provider in a cloud environment, an encryption key passphrase stored in a secure storage separate and distinct from a database persistence and object store of the database service, the encryption key passphrase used as a key to encrypt and decrypt a key storage of the database service that stores one or more keys used by the database service; and to use the encryption key passphrase by a recovery service of the database provider in the cloud environment to recover the database service and its associated key storage.

20 Claims, 7 Drawing Sheets

300

```
┌─────────────────────────────────────────────────────────────┐
│  RECEIVE, BY A DATABASE SERVICE FROM AN ENCRYPTION SERVICE OF │
│     A DATABASE PROVIDER IN A CLOUD ENVIRONMENT,              │
│           AN ENCRYPTION KEY PASSPHRASE                        │
│                                                         305   │
└─────────────────────────────────────────────────────────────┘
                              │
                              ▼
┌─────────────────────────────────────────────────────────────┐
│  ENCRYPT A KEY STORAGE MANAGED BY THE DATABASE SERVICE       │
│  USING THE ENCRYPTION KEY PASSPHRASE, THE KEY STORAGE        │
│     STORING ONE OR MORE ENCRYPTION KEYS USED                 │
│              BY THE DATABASE SERVICE                          │
│                                                         310   │
└─────────────────────────────────────────────────────────────┘
                              │
                              ▼
┌─────────────────────────────────────────────────────────────┐
│   STORE AN ENCRYPTED BACKUP OF THE KEY STORAGE IN AN         │
│        OBJECT STORE OF THE DATABASE SERVICE                  │
│                                                         315   │
└─────────────────────────────────────────────────────────────┘
                              │
                              ▼
┌─────────────────────────────────────────────────────────────┐
│ STORE THE PASSPHRASE IN A SECURE STORAGE THAT IS SEPARATE    │
│ AND DISTINCT FROM THE OBJECT STORE OF THE DATABASE SERVICE   │
│   AND A DATA PERSISTENCE OF THE DATABASE SERVICE             │
│                                                         320   │
└─────────────────────────────────────────────────────────────┘
```

```
┌─────────────────────────────────────────────────────────────┐
│  INITIALIZE, IN RESPONSE TO A REQUEST TO RECREATE THE       │
│  DATABASE SERVICE, A NEW INSTANCE OF THE DATABASE SERVICE   │
│                                                         505 │
└─────────────────────────────────────────────────────────────┘
                              │
                              ▼
┌─────────────────────────────────────────────────────────────┐
│  RECEIVE, BY A DATABASE SERVICE FROM A RECOVERY SERVICE OF  │
│  A DATABASE PROVIDER IN A CLOUD ENVIRONMENT,                │
│  AN ENCRYPTION KEY PASSPHRASE                               │
│                                                         510 │
└─────────────────────────────────────────────────────────────┘
                              │
                              ▼
┌─────────────────────────────────────────────────────────────┐
│  ACCESS, USING THE ENCRYPTION KEY PASSPHRASE RECEIVED FROM  │
│  THE RECOVERY SERVICE, THE ENCRYPTED BACKUP OF THE KEY      │
│  STORAGE IN THE OBJECT STORE OF THE DATABASE SERVICE        │
│                                                         515 │
└─────────────────────────────────────────────────────────────┘
                              │
                              ▼
┌─────────────────────────────────────────────────────────────┐
│  PERFORM, BY THE NEW DATABASE SERVICE INSTANCE, A RECOVERY  │
│  OF THE KEY STORAGE USING THE ENCRYPTED BACKUP OF THE KEY   │
│  STORAGE                                                    │
│                                                         520 │
└─────────────────────────────────────────────────────────────┘
                              │
                              ▼
┌─────────────────────────────────────────────────────────────┐
│  PERFORM, BY THE NEW DATABASE SERVICE INSTANCE, A RECOVERY  │
│  OF DATA BACKUPS AND LOG BACKUPS USING THE ONE OR MORE      │
│  ENCRYPTION KEYS IN THE RECOVERED KEY STORAGE               │
│                                                         525 │
└─────────────────────────────────────────────────────────────┘
```

SECURE STORAGE OF ANCHOR PASSPHRASE FOR DBMS

BACKGROUND

A number of large cloud infrastructure and service providers have emerged to provide the infrastructure to support customers in need of robust and reliable storage and compute needs. A benefit offered by these providers is that they are highly scalable, responsive to their customers' increasing storage and processing needs. These large cloud infrastructure and service providers, also referred to as hyperscalers, may provide the hosting infrastructure for different types of services, including for example, a database service. An important aspect of providing a database service is providing backup and recovery processes to protect the database service against data losses and to reconstruct the database in the event of, for example, a data loss or other data inconsistency. In some aspects, a cloud backup service may provide a number of advantages and benefits, including, for example, assured access to the data, automated backup and management thereof, secure and affordable backups, as well as quick data restorations.

However, data privacy and data protection are significant security concerns for those that store, or plan to store, data in the cloud. Data encryption is viewed as a critical component for offering services in the cloud.

Accordingly, there exists a need for an efficient and intelligent process and system to encrypt and recover database data for database in a cloud environment.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 3 is an illustrative flow diagram of a process for the secure storage of an encryption key passphrase for encrypted database backups, in accordance with an example embodiment.

FIG. 5 is an illustrative flow diagram of a process for a recovery of a database using a securely stored encryption key passphrase for encrypted database backups, in accordance with an example embodiment.

Figure 1:
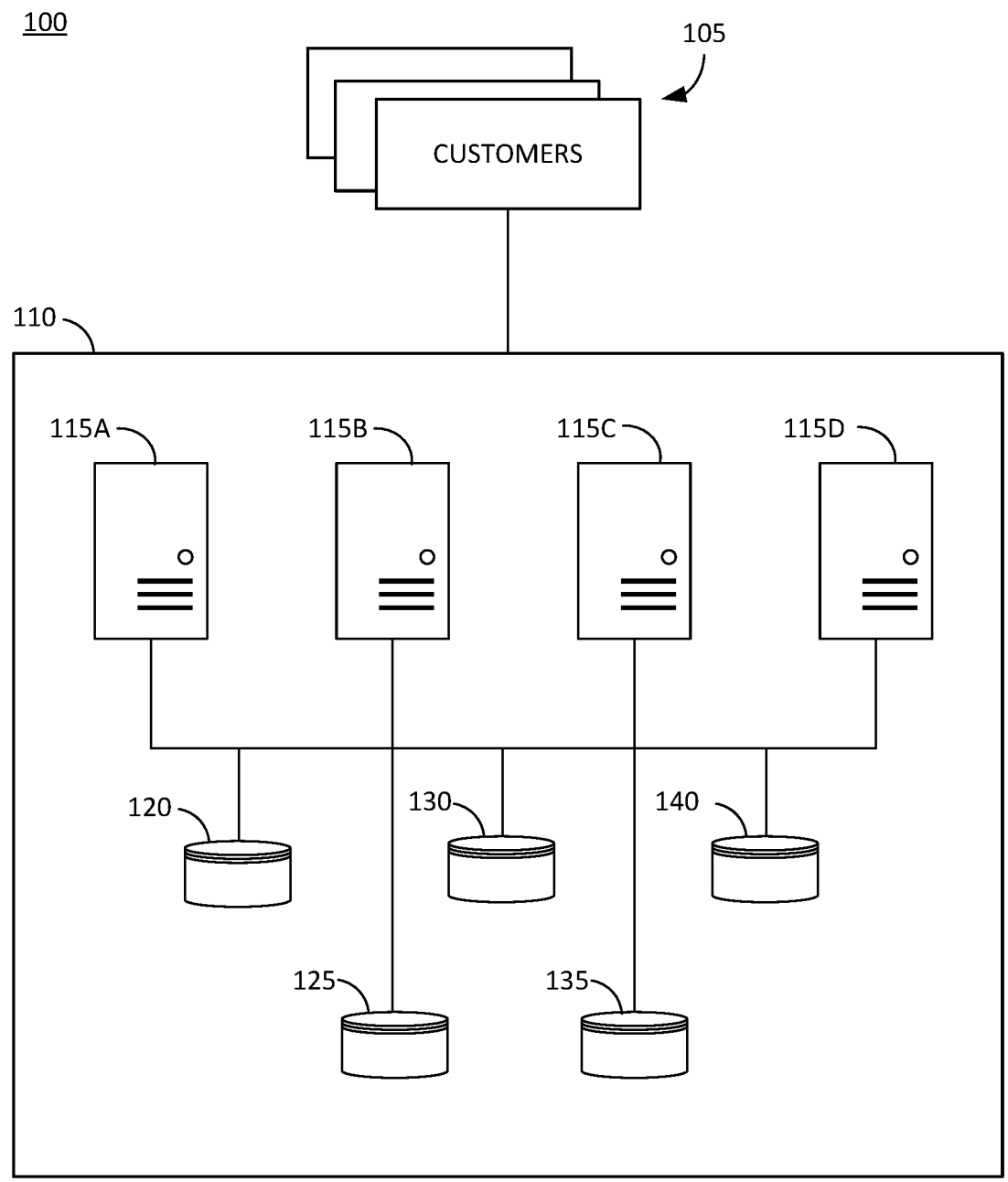
FIG. 1 is an illustrative block diagram of a hyperscaler environment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the present disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

As used herein, the term "hyperscaler" refers to a company or other entity that provides, for example, public cloud and cloud service industries, although other services and businesses might also be provided. Hyperscalers provide cloud storage and compute infrastructures on a scale (i.e., size and extent) that far exceeds that of typical, conventional data centers. Hyperscalers may provide, maintain, and upgrade the infrastructure, including hardware, (customized) software, facilities, power management systems, etc. to provide services to customers with improved uptime. While Hyperscalers might provide a number of different services to end users (e.g., customers), aspects related to are, in some embodiments, significant to the present disclosure.

FIG. 1 is a high level illustrative depiction of a hyperscaler architecture 100, in accordance with an embodiment herein. A hyperscaler 110 includes all of the hardware, software, networks, facilities, energy management systems, and other operational aspects, whether custom or commodity acquisitions, to enable and support large cloud infrastructure and services for large numbers of users 105 (e.g., millions of customers of hosted services). All of these different aspects of the hyperscaler are not shown in FIG. 1. FIG. 1 includes illustrative representations of the many (e.g., >100,000) servers and storage devices implemented by the example hyperscaler to support the massive storage and compute capabilities of the its cloud infrastructure. Shown are servers 115A, 115B, 115C, and 115D that are networked to each other and to data storage devices/systems 120, 125, 130, 135, and 140. The servers and data storage devices depicted in FIG. 1 may include redundancies of some or all of each other to provide, in conjunction with certain executable processes, the reliability and resiliency of the hyperscaler environment 100. Additionally, FIG. 1 is an illustrative, figurative representation of hyperscaler servers and data storage devices/systems, as opposed to an actual physical or logical configuration thereof. In some aspects, the features of the present disclosure are not limited to any particular configuration or implementation of a hyperscaler or other cloud environment.

Hyperscaler 100 may host a database for one or more of customers 105 in the cloud provided by its cloud infrastructure, where the database is provided as a service to the customers (i.e., Database-as-a-Service, DBaaS). In some aspects, the database offered by hyperscaler 100 stores backups for database service instances in an object storage where the backups (i.e., data) are stored as distinct "objects". Referring to the example of FIG. 1, the object storage may be provided and maintained by the storage devices/systems 120, 125, 130, 135, and 140, in part and/or different combinations. The backups might be used in a recovery process to restore the database service instance to a particular point in time.

In some aspects, a hyperscaler database service provider may provide cloud infrastructure and database services to customer users thereof. A backup service may be offered by the database service provider to determine and manage the selection and administration of backup and recovery processes for the database services provided by the database service provider. The backup service can be further configured to issue commands or requests to the database service to execute the backup strategy determined by the backup service, wherein the database service may proceed to create the specified backup type and store the backup in the database service's storage device or system.

In some aspects, an encryption service that might be offered by the database service provider to provide and manage at least some security and encryption functions for database service and its associated data hosted in the cloud environment. In addition to using encryption to secure and protect the database data, the encryption service may also mange encryption and decryption keys used by the database, including the creation and storage thereof. In some aspects, a database service provider in some embodiments herein may provide a recovery service that might manage the recovery of a database in the event of, for example, a disaster that eliminates, corrupts, or otherwise introduces an inconsistency in the data of a database. The recovery service may be further configured to recover encryption and decryption keys used by the database.

Figure 2:
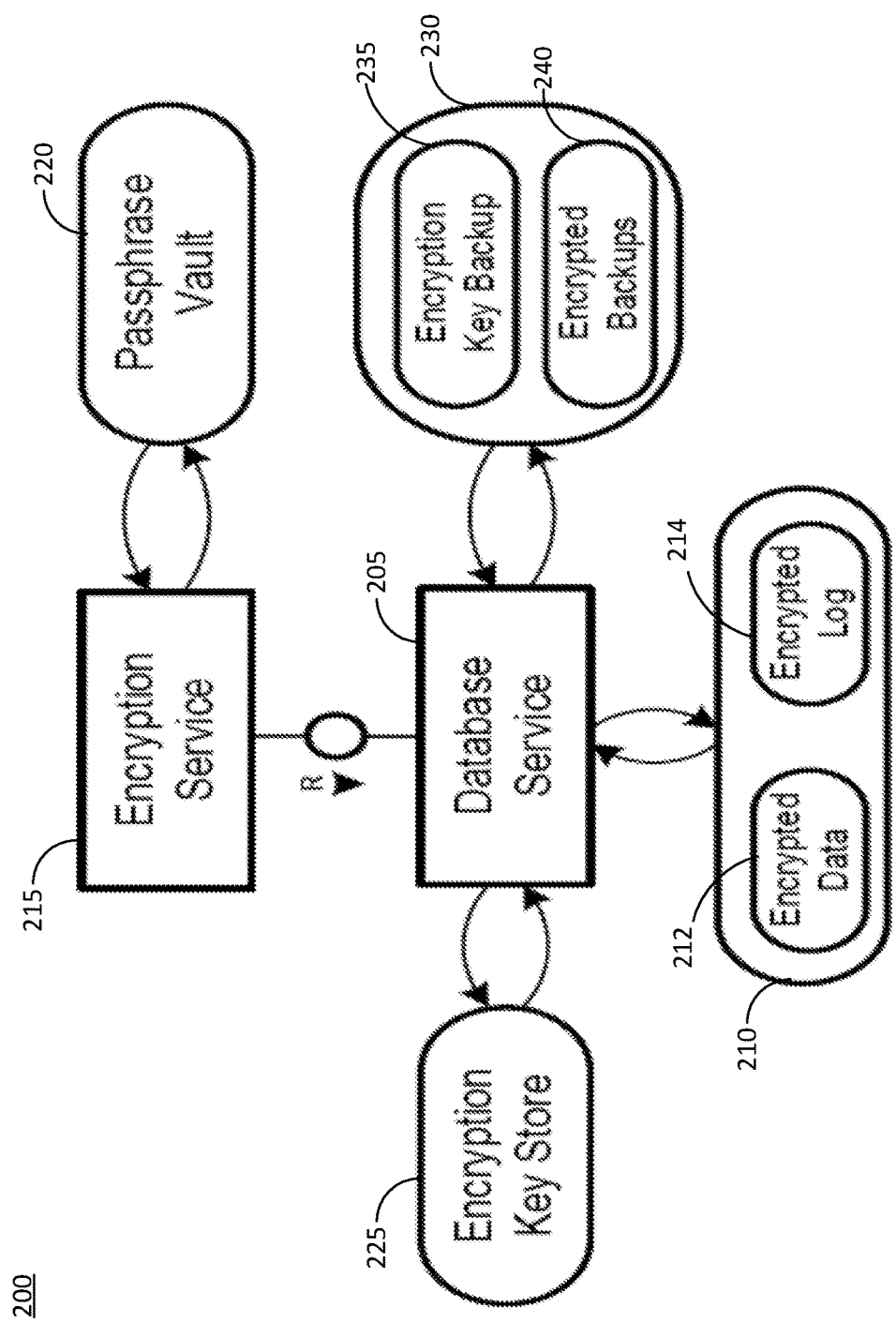
FIG. 2 is an illustrative block diagram of an architecture to securely store an encryption key passphrase for encrypted database backups, in accordance with an example embodiment.

FIG. 2 is an illustrative block diagram of an architecture 200 to securely store an encryption key passphrase for encrypted database backups in a cloud environment, in accordance with an example embodiment. Database service instance 205 is hosted in the cloud by a database service provider. Data generated and used by database service 205 may be persisted in a database persistence 210 that stores data and corresponding log data for the database service. The database service provider may also provide encryption service 215. Backups of the database data maybe backed up to an object store 235, that stores data as "objects". Object store 235 may store backups of the database service's data. In some embodiments, the backups may include data backups and log backups corresponding to the database data persisted at storage 210. For security concerns, the data of database service 205 may be encrypted. Furthermore, the backups for database service 205 may also be encrypted. In the example of FIG. 2, encryption service 215 is provided by the database service provider to communicate with the database service (e.g., via an Application Programming Interface, API) to manage the encryption of, for example, data hosted in data 212 and log 214 volumes, as well as the backups thereof (i.e., backups 240). As shown in FIG. 2, encryption service 215 manages the key handling including, for example, for the database service's data 212, log data 214, and the backups of the database data 240 (including both data backups and log backups The keys used to implement the encryption and decryption of the database data and backups may be stored in a secure data storage device or system. In FIG. 2, the keys used for the encryption of database service 205 are stored in a secure encryption key store 225 that is separate from the database persistence 225 and object store 235.

In some embodiments, to provide an additional layer or level of security against, for example, a data attacker gaining access to the encryption keys stored in encryption key store 225, the encryption key store 225 itself may be encrypted using an encryption key passphrase that is stored in a passphrase vault 220. In some aspects, database service 205 may not access passphrase vault 220. Access to passphrase vault 220 might be limited to encryption service 215. In some embodiments, passphrase vault 220 might comprise an application, system, device, or service separate and apart from database service 205. Implementations of passphrase vault 220 might include highly secure data storage provided by a third-party entity with complex and restrictive access limited to specifically authorized and authenticated applications, services, and systems, such as encryption service 215.

Referring to FIG. 2, the encryption keys of database service 205 are stored in encryption key store 225 and are backed up the object store 235 using an encryption key passphrase that is stored in the secure location of passphrase vault 220. In some aspects, the passphrase for each database service instance is unique. The passphrase stored in the passphrase vault may be generated using any key generation process or technique, including those now known and those that become known in the future. Note that while the term "passphrase" is used herein to refer to the unique encryption key stored in the passphrase vault 220, this encryption key may comprise a data string generated by a computer system based on one or more algorithms, as opposed to a phrase selected by a human.

FIG. 3 is an illustrative flow diagram of a process for the secure storage of an encryption key passphrase, in some embodiments herein. In some embodiments, process 300 may be implemented by a system or parts thereof embodied by the architecture of FIG. 2. At operation 305, a database service may receive an encryption key passphrase. This might occur when the database service instance is first created. Upon creation of the database service instance, the data and subsequent backups thereof may be encrypted. In an effort to ensure security and recoverability of the database service, the encryption keys used by the database service (i.e., an encryption key store storing all of the database's encryption keys) may immediately be backed up to a secure location (e.g., FIG. 2, object store 230). A passphrase that will be the "key" to access the encryption keys of the database service (i.e., the encryption key store storing all of the database's encryption keys) is generated.

At operation 310, the generated encryption key passphrase is used to encrypt the encryption key storage (e.g., FIG. 2, 225). A backup of the encrypted key storage (e.g., FIG. 2, 230) is stored in the object store of the database service with, for example, encrypted data backups of the database service, at operation 315.

The unique passphrase generated for the database service in the example of FIG. 3 is stored in a secure storage, a passphrase vault, at operation 320. The location of the passphrase vault is separate and distinct from the other storages used by the database service. In this manner, an attack or other compromise of the database service will not impact or have access to the passphrase vault. Additionally, the encryption of the backup of the encryption keys (i.e., the encryption of the encryption store storing all of the encryption keys for the database service) provides an additional layer of security and protection since even if the database including the backup of the encryption keys were accessed by an attacker, this backup is encrypted by the passphrase encryption key that is neither known nor accessible to the database service and is located in a high security location separate and distinct from the database.

Figure 4:
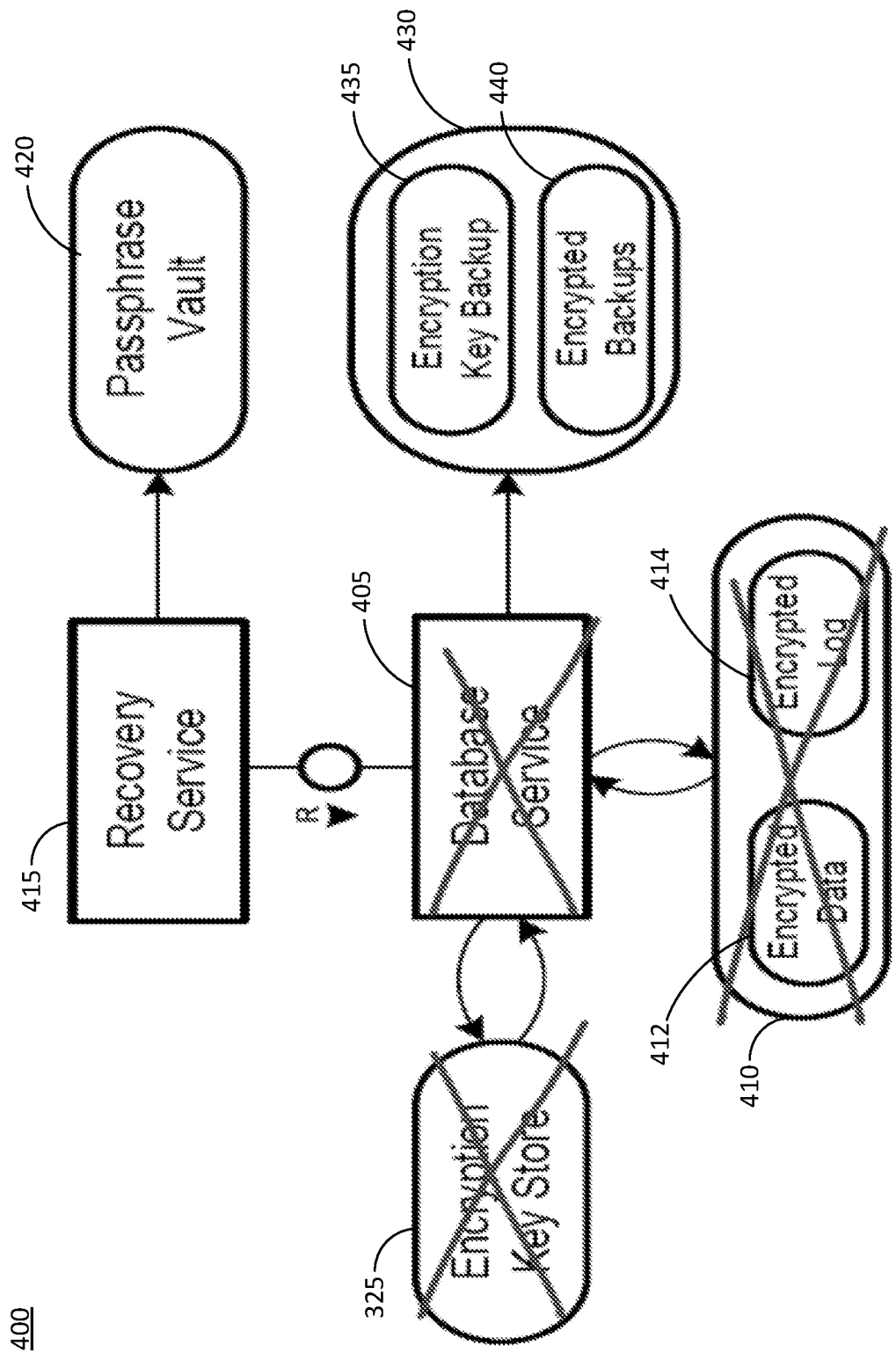
FIG. 4 is an illustrative block diagram of an architecture to recover a database using a securely stored encryption key passphrase for encrypted database backups, in accordance with an example embodiment.

FIG. 4 is an illustrative block diagram of an architecture illustrating some aspects related to a recovery of a database using a securely stored encryption key passphrase for encrypted database backups, in accordance with an example embodiment. In the cloud environment of FIG. 4, database service 405, a data persistence 410 that would normally store encrypted data and encrypted logs for the database, and an encryption key store 325 that would normally store the encryption keys used by the database service 405 are all unavailable. The unavailability of these aspects of the database service may be due to a disaster of some type, including a complete or partial loss of data consistency in the database. Hence, there is a need to recover the database. Since the database data is encrypted, the encryption key store 325 needs to be recovered so that the keys stored therein can be accessed and used to decrypt the data backups 440 stored in object store 430 to restore the encrypted data 412 and the encrypted log data 414 persisted at 410. The encryption key passphrase for database service 405 may be retrieved from passphrase vault 420 by recovery service 415 provided by the database provider hosting database service 405. The encryption key passphrase may be used to "unlock" the encryption key backup 435. Access to the separate, secure data passphrase vault may be limited to only certain authorized and authenticated services of the database provider (e.g., only the backup and recovery services), not the database service itself even. The accessed encryption key backup 435 may be used to recover the encryption key store 325 including, for example, all of the encrypt and decryption keys used by database service 405. Upon restoration of the encryption key store, the database service 405 can proceed to recover its data 412 and 414 so that it can resume operations.

FIG. 5 is an illustrative flow diagram of a process for a recovery of a database using a securely stored encryption key passphrase for encrypted database backups, in accordance with an example embodiment. In some embodiments, process 500 may be implemented using the system architectures depicted in FIG. 4.

At operation 505, a new database service instance may be initialized in response to a request, instruction, or message to execute a recovery process for a database service. The request for the new database service instance might be in response to a disaster of some sort or type, necessitating the need to recreate the database service.

At operation 510, a recovery service of the database provider may retrieve or otherwise obtain an encryption key passphrase from a passphrase vault, in accordance with some embodiments herein. The encryption key passphrase may be used to access, at operation 515, a backup of an encryption key store that includes all of the encryption and decryption keys used by the database service being recovered.

Having successfully accessed the backup of an encryption key store using the encryption key passphrase, process 500 proceeds to operation 520 where the recovery of the encryption key store is executed. The recovered encryption key store will include, for example, all of the encryption and decryption keys used by the database service and the newly initialized (i.e., empty) database service can use those keys to recover all of the database data from the encrypted backups for the time period specified by the recovery service of the database service provider.

Note that access to the encryption key passphrase may be performed once, during the initialization of a new database service instance.

Figure 6:
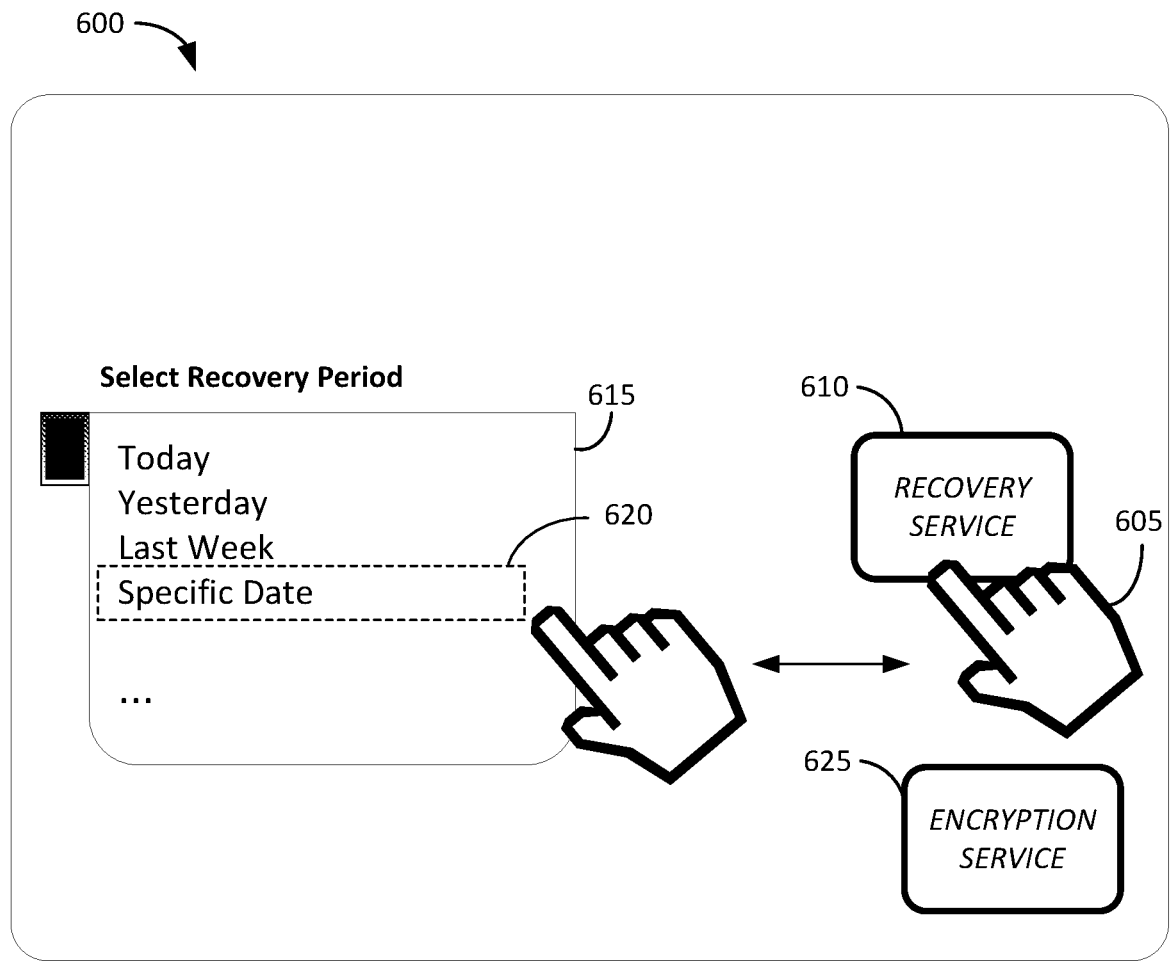
FIG. 6 is an outward facing user interface related to a system and process for a database service in a cloud environment, in accordance with an example embodiment.

FIG. 6 is an illustrative diagram of an outward facing user interface (UI) 600 related to the creation, storage, and use of an encryption key passphrase by a database service in a cloud environment, in accordance with an example embodiment. UI 600 may be displayed within a display device associated with a database backup service or a display device independent of the database service (e.g., a display of a device or system in communication with the database service over a network via a browser application). Selection of one or more UI elements (e.g., icons, buttons, drop-down menu options, etc.) by a touchscreen input, computer pointer 605, etc. may result in the initialization or continuance of an encryption service or a recovery service process for a database service in a cloud environment (e.g., the selection of "Recovery Service" button 610). In the example of FIG. 6, UI 600 includes a UI element 615 for selecting a database recovery period to be implemented via a drop-down menu that may facilitate selection and entry of a particular time period for which a recovery is to include, where the recovery may cover today, yesterday, the last week, or a particular time frame 620. UI button 625 provides a UI mechanism to select, initiate, or continue an encryption service that may include the generation and storage of an encryption key passphrase, as disclosed herein. The execution of the encryption process(es) and the recovery process(es) may be automated.

Figure 7:
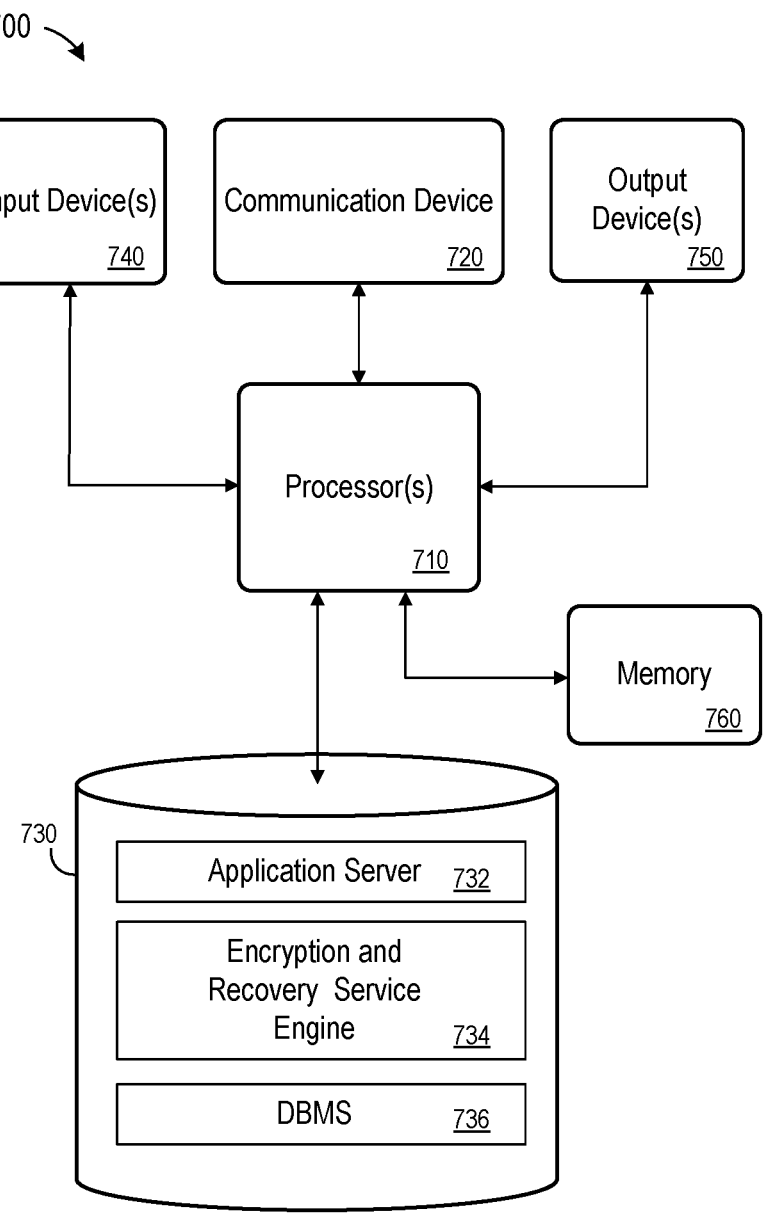
FIG. 7 is an illustrative block diagram of a computing system, in accordance with an example embodiment.

FIG. 7 illustrates a computing system 700 that may be used in any of the architectures or frameworks (e.g., FIGS. 2 and 4) and processes (e.g., FIGS. 3 and 5) disclosed herein, in accordance with an example embodiment. FIG. 7 is a block diagram of server node 700 embodying a system to create, store, and use an encryption key passphrase by a database service in a cloud environment, according to some embodiments. Server node 700 may comprise a general-purpose computing apparatus and may execute program code to perform any of the functions described herein. Server node 700 may comprise an implementation of at least some features of the architectures of FIGS. 2 and 4 in some embodiments. Server node 700 may include other unshown elements according to some embodiments.

Server node 700 includes processing unit(s) 710 operatively coupled to communication device 720, data storage device 730, one or more input devices 740, one or more output devices 750, and memory 760. Communication device 720 may facilitate communication with external devices, such as an external network or a data storage device. Input device(s) 740 may comprise, for example, a keyboard, a keypad, a mouse or other pointing device, a microphone, knob or a switch, an infra-red (IR) port, a docking station, and/or a touch screen. Input device(s) 740 may be used, for example, to enter information into apparatus 700. Output device(s) 750 may comprise, for example, a display (e.g., a display screen) a speaker, and/or a printer.

Data storage device 730 may comprise any appropriate persistent storage device, including combinations of magnetic storage devices (e.g., magnetic tape, hard disk drives and flash memory), optical storage devices, Read Only Memory (ROM) devices, etc., while memory 760 may comprise Random Access Memory (RAM).

Application server 732 may each comprise program code executed by processor(s) 710 to cause server 700 to perform any one or more of the processes described herein. Encryption and Recovery service engine 734 may execute one or more processes to implement an encryption service and a recovery service in a cloud environment. Embodiments are not limited to execution of these processes by a single computing device. Data storage device 730 may also store data and other program code for providing additional functionality and/or which are necessary for operation of server 700, such as device drivers, operating system files, etc. DBMS 736 may store and manage a variety of data types and structures, including, for example, master copies.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A system comprising:
   a memory storing processor-executable program code; and
   a processor to execute the processor-executable program code in order to cause the system to:
   receive, by a database service from an encryption service of a database provider in a cloud environment, an encryption key passphrase;
   encrypt a key storage managed by the database service using the encryption key passphrase, the key storage storing one or more encryption keys used by the database service;
   store an encrypted backup of the key storage in an object store of the database service; and
   store the passphrase in a secure storage that is separate and distinct from the object store of the database service and a data persistence of the database service.

2. The system of claim 1, wherein the data persistence of the database service is an object store to store data backups of the database service.

3. The system of claim 1, wherein the object store storing the encrypted backup of the key storage further stores encrypted backups of the database service.

4. The system of claim 1, wherein the storing of the encrypted backup of the key storage in the object store of the database service is performed in response to an initialization of the database service.

5. The system of claim 1, wherein the secure storage storing the encryption key passphrase is inaccessible by the database service.

6. The system of claim 1, wherein the processor is further configured to execute the processor-executable program code in order to cause the system to:
   initialize, in response to a request to recreate the database service, a new instance of the database service;
   receive, by the new database service instance from a recovery service of the database provider, the encryption key passphrase;
   access, using the encryption key passphrase received from the recovery service, the encrypted backup of the key storage in the object store of the database service;
   perform, by the new database service instance, a recovery of the key storage using the encrypted backup of the key storage; and
   perform, by the new database service instance, a recovery of data backups and log backups using the one or more encryption keys in the recovered key storage.

7. The system of claim 6, wherein the encryption key passphrase is used once by the new instance of the database service to access the encrypted backup of the key storage.

8. A computer-implemented method, the method comprising:
   receiving, by a database service from an encryption service of a database provider in a cloud environment, an encryption key passphrase;
   encrypting a key storage managed by the database service using the encryption key passphrase, the key storage storing one or more encryption keys used by the database service;
   storing an encrypted backup of the key storage in an object store of the database service; and
   storing the passphrase in a secure storage that is separate and distinct from the object store of the database service and a data persistence of the database service.

9. The method of claim 8, wherein the data persistence of the database service is an object store to store data backups of the database service.

10. The method of claim 8, wherein the object store storing the encrypted backup of the key storage further stores encrypted backups of the database service.

11. The method of claim 8, wherein the storing of the encrypted backup of the key storage in the object store of the database service is performed in response to an initialization of the database service.

12. The method of claim 8, wherein the secure storage storing the encryption key passphrase is inaccessible by the database service.

13. The method of claim 8, further comprising:
   initializing, in response to a request to recreate the database service, a new instance of the database service;
   receiving, by the new database service instance from a recovery service of the database provider, the encryption key passphrase;
   accessing, using the encryption key passphrase received from the recovery service, the encrypted backup of the key storage in the object store of the database service;
   performing, by the new database service instance, a recovery of the key storage using the encrypted backup of the key storage; and
   performing, by the new database service instance, a recovery of data backups and log backups using the one or more encryption keys in the recovered key storage.

14. The method of claim 13, wherein the encryption key passphrase is used once by the new instance of the database service to access the encrypted backup of the key storage.

15. A non-transitory, computer readable medium storing instructions, which when executed by at least one processor cause a computer to perform a method comprising:
   receiving, by a database service from an encryption service of a database provider in a cloud environment, an encryption key passphrase;
   encrypting a key storage managed by the database service using the encryption key passphrase, the key storage storing one or more encryption keys used by the database service;
   storing an encrypted backup of the key storage in an object store of the database service; and
   storing the passphrase in a secure storage that is separate and distinct from the object store of the database service and a data persistence of the database service.

16. The medium of claim 15, wherein the data persistence of the database service is an object store to store data backups of the database service.

17. The medium of claim 15, wherein the storing of the encrypted backup of the key storage in the object store of the database service is performed in response to an initialization of the database service.

18. The medium of claim 15, wherein the secure storage storing the encryption key passphrase is inaccessible by the database service.

19. The medium of claim 15 storing instructions, which when executed by at least one processor cause a computer to perform a method further comprising: initializing, in response to a request to recreate the database service, a new instance of the database service; receiving, by the new database service instance from a recovery service of the database provider, the encryption key passphrase; accessing, using the encryption key passphrase received from the recovery service, the encrypted backup of the key storage in the object store of the database service; performing, by the new database service instance, a recovery of the key storage using the encrypted backup of the key storage; and performing, by the new database service instance, a recovery of data backups and log backups using the one or more encryption keys in the recovered key storage.

20. The medium of claim 19, wherein the encryption key passphrase is used once by the new instance of the database service to access the encrypted backup of the key storage.

\* \* \* \* \*